A. H. BIEKER.
FILLER PLUG.
APPLICATION FILED MAY 9, 1916.
1,228,285.
Patented May 29, 1917.
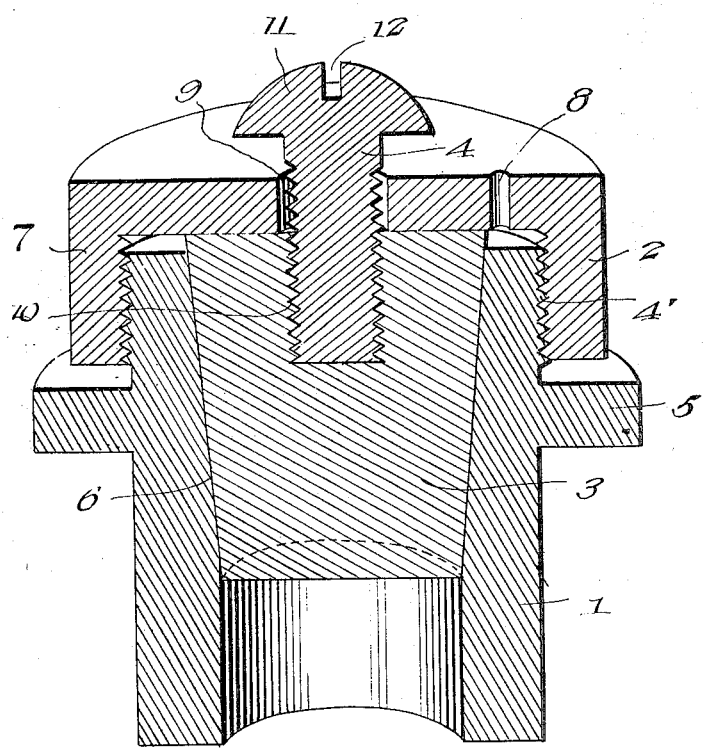
Witnesses
Hugh H. Ott
J. W. Garner
Inventor
A. H. Bieker,
By Victor J. Evans
Attorney

UNITED STATES PATENT OFFICE.

ANTHONY HENRY BIEKER, OF ALLAN, SASKATCHEWAN, CANADA.

FILLER-PLUG.

1,228,285.  Specification of Letters Patent.  Patented May 29, 1917.

Application filed May 9, 1916. Serial No. 96,461.

*To all whom it may concern:*

Be it known that I, ANTHONY H. BIEKER, a subject of the King of Great Britain, residing at Allan, in the Province of Saskatchewan and Dominion of Canada, have invented new and useful Improvements in Filler-Plugs, of which the following is a specification.

This invention is an improved filler plug for gasolene tanks, portable lights, lanterns, and the like, the object of the invention being to provide an improved device of this character which is simple in construction, which is air tight and which provides a filler opening of maximum size.

The invention consists in the features of construction, combination, and arrangement of devices, herein fully described and claimed.

The accompanying drawing is a sectional perspective view of a filler plug constructed and arranged in accordance with my invention.

My improved filler plug embodies a nipple 1, a cap 2, a plug or closure 3, and a screw 4. The nipple, which may be attached to a gasolene tank, a lamp, lantern, or any other suitable vessel which requires to be filled with gasolene or other liquid, is provided with a threaded outer portion 4′, an annular surrounding flange 5 spaced from the outer end and the bore of the nipple has a substantially funnel shape or tapered outer portion 6.

The plug or closure 3 is of frusto-conical form and is tapered to fit snugly in the tapered portion of the bore, providing a maximum bearing surface and forming an air tight closure for the nipple when forced in the tapered portion of the bore of the nipple. The cap is provided with a cylindrical portion 7 which is interiorly threaded to engage the threaded outer end 4 of the nipple and the cap is also provided with an eccentrically arranged vent opening 8, coincident with the wall of the nipple and is further provided with a centrally arranged unthreaded opening 9.

The screw 4 passes through and is freely movable in the opening 9 and engages in a threaded bore 10 in the outer portion of the plug or closure. The screw is also provided with an enlarged head 11 which is here shown as having a groove 12 for engagement by a screw driver or other like implement.

The screw connects the plug and cap together, but allows the cap when unscrewed to move vertically from the top of the plug, to the head of the screw. The screw serves to draw out the plug, when the cap is further unscrewed from the nipple, as will be understood. The vent 8 permits the passage of air or gas outwardly from the tank through the nipple when the plug is raised. It will be observed that the vent 8 is arranged over one side of the nipple and owing to such arrangement and the tapered construction of the plug it is not necessary to entirely remove the plug in order to vent air or gas but is only necessary to unscrew the cap sufficiently to cause the screw 4 to slightly raise the plug in the nipple and unseat the plug from the tapered portion of the nipple. When the plug is removed, together with the cap, there is a free passage provided through the nipple for the gasolene. When the plug is replaced in the conical outer portion of the nipple and the cap is screwed on, the cap forces the plug into the nipple and serves to effectually close the same and render it air and liquid tight. My improved plug enables me to dispense entirely with washers, leads, rubber gaskets, and the like and also enables me to dispense entirely with the use of wrenches.

Having thus described my invention, what I claim is:

1. In combination with a nipple, a plug for the nipple, a cap having threaded engagement with the nipple and also provided with a vent opening, and with a centrally arranged unthreaded opening and a screw movable freely through said central opening having threaded engagement with the plug and provided at its outer end with an enlarged head, spaced above the cap and permitting limited vertical movement of the cap independently of the plug.

2. In combination with a nipple, a plug for the nipple, a cap having threaded engagement with the nipple and also provided with a vent opening, and with a centrally arranged unthreaded opening and a screw movable freely through said central opening having threaded engagement with the plug and provided at its outer end with an enlarged head, spaced above the cap and permitting limited vertical movement of the cap independently of the plug, the said plug being tapered and the said nipple having a correspondingly shaped outer bore in which the nipple is adapted to be closely fitted by the cap.

In testimony whereof I affix my signature.

ANTHONY HENRY BIEKER.